US008306678B2

(12) United States Patent
Fleury et al.

(10) Patent No.: US 8,306,678 B2
(45) Date of Patent: Nov. 6, 2012

(54) DEVICES AND METHODS FOR FILTERING TERRAIN AND OBSTACLE ANTI-COLLISION ALERTS FOR AIRCRAFT

(75) Inventors: Stéphane Fleury, Colomiers (FR); Nicolas Marty, Saint Sauveur (FR); Julia Percier, Cugnaux (FR)

(73) Assignee: Thales, Neilly-sur-Seine (FR)

( * ) Notice: Subject to any disclaimer, the term of this patent is extended or adjusted under 35 U.S.C. 154(b) by 889 days.

(21) Appl. No.: 12/047,885

(22) Filed: Mar. 13, 2008

(65) Prior Publication Data

US 2008/0306639 A1 Dec. 11, 2008

(30) Foreign Application Priority Data

Mar. 13, 2007 (FR) ..................................... 07 01794

(51) Int. Cl.

| | |
|---|---|
| ***G05D 1/00*** | (2006.01) |
| ***G06F 17/00*** | (2006.01) |
| ***G06F 17/10*** | (2006.01) |
| ***G08G 1/16*** | (2006.01) |
| ***G08G 5/04*** | (2006.01) |

(52) U.S. Cl. ............ 701/9; 701/409; 701/466; 701/468; 701/301; 340/945; 340/963; 244/76 R

(58) Field of Classification Search .............. 701/1, 3–9, 701/14, 200, 204, 205–213, 223, 300, 301, 701/120, 400, 408, 409, 466, 467, 468, 487, 701/532–536; 340/945, 961, 963, 971–980, 340/988–990, 995.1–995.12, 995.17–995.22, 340/995.24–995.25, 995.28; 244/75.1, 76 R, 244/175, 180–194

See application file for complete search history.

(56) References Cited

U.S. PATENT DOCUMENTS 5,414,631 A 5/1995 Denoize et al.
5,488,563 A 1/1996 Chazelle et al.

(Continued)

FOREIGN PATENT DOCUMENTS

EP 0 964 381 A2 12/1999

(Continued)

OTHER PUBLICATIONS

U.S. Appl. No. 11/575,969, filed Mar. 24, 2007 (Not Published Yet).

(Continued)

*Primary Examiner* — Thomas Tarcza
*Assistant Examiner* — Edward Pipala
(74) *Attorney, Agent, or Firm* — Lowe, Hauptman, Ham & Berner, LLP

(57) ABSTRACT

The present invention relates to a device and methods for filtering anti-collision alerts for aircraft having a locating system charting the position of the aircraft and estimating the precision of its position. A navigation system of the aircraft calculates at least the actual speed of the aircraft, the speed instruction and a first deviation between the instruction and the actual speed, and the deviation being compared with a first reference overshoot threshold. An anti-collision system generates alerts. An alarms manager of the aircraft centralizes the alerts transmitted by the terrain anti-collision equipment of the aircraft to the crew. The alerts each posses a coding of the danger level, and the danger levels form part of a first predetermined set. The alert filter according to the invention filters sets of alerts according to the coding of their danger level.

13 Claims, 6 Drawing Sheets

U.S. PATENT DOCUMENTS

| | | | |
|---|---|---|---|
| 5,638,282 | A | 6/1997 | Chazelle et al. |
| 5,677,842 | A | 10/1997 | Denoize et al. |
| 6,088,654 | A | 7/2000 | Lepere et al. |
| 6,317,663 | B1 | 11/2001 | Meunier et al. |
| 6,480,120 | B1 | 11/2002 | Meunier |
| 6,567,728 | B1 | 5/2003 | Kelly et al. |
| 2002/0099478 | A1 * | 7/2002 | Ishihara et al. .................. 701/9 |
| 2003/0016145 | A1 * | 1/2003 | Bateman ...................... 340/967 |
| 2003/0036828 | A1 * | 2/2003 | Conner et al. .................... 701/9 |
| 2003/0184450 | A1 * | 10/2003 | Muller et al. ................. 340/963 |
| 2004/0093131 | A1 * | 5/2004 | Block et al. ...................... 701/9 |
| 2004/0181318 | A1 * | 9/2004 | Redmond et al. ................. 701/9 |
| 2005/0109872 | A1 * | 5/2005 | Voos et al. .................. 244/3.17 |
| 2005/0200501 | A1 * | 9/2005 | Smith .......................... 340/963 |
| 2006/0074559 | A1 * | 4/2006 | Meunier ...................... 701/301 |
| 2006/0097895 | A1 * | 5/2006 | Reynolds et al. ............. 340/961 |
| 2006/0109166 | A1 * | 5/2006 | Arthur et al. .................... 342/29 |
| 2007/0031007 | A1 | 2/2007 | Bitar |
| 2007/0078591 | A1 | 4/2007 | Meunier et al. |
| 2007/0078592 | A1 | 4/2007 | Meunier et al. |
| 2007/0088492 | A1 | 4/2007 | Bitar et al. |
| 2007/0150117 | A1 | 6/2007 | Bitar et al. |
| 2007/0150121 | A1 | 6/2007 | Bitar et al. |
| 2007/0174005 | A1 | 7/2007 | Bitar et al. |
| 2007/0187554 | A1 | 8/2007 | Bitar et al. |
| 2007/0215745 | A1 | 9/2007 | Fleury et al. |
| 2007/0219705 | A1 | 9/2007 | Bitar et al. |
| 2007/0250223 | A1 | 10/2007 | Francois et al. |
| 2007/0276553 | A1 | 11/2007 | Bitar et al. |
| 2007/0285283 | A1 | 12/2007 | Bitar et al. |
| 2008/0004801 | A1 | 1/2008 | Bitar et al. |
| 2008/0039984 | A1 | 2/2008 | Bitar et al. |
| 2008/0046171 | A1 | 2/2008 | Bitar et al. |
| 2008/0103691 | A1 * | 5/2008 | Chen et al. .................... 701/207 |
| 2008/0243383 | A1 * | 10/2008 | Lin ............................... 701/213 |

FOREIGN PATENT DOCUMENTS

| | | | |
|---|---|---|---|
| FR | 2813963 | A1 | 3/2002 |
| FR | 2 842 594 | A1 | 1/2004 |
| FR | 2 848 661 | A1 | 6/2004 |
| FR | 2 860 292 | A1 | 4/2005 |
| FR | 2 864 270 | A1 | 6/2005 |
| FR | 2 864 312 | A1 | 6/2005 |
| FR | 2 867 851 | A1 | 9/2005 |
| FR | 2 868 835 | A1 | 10/2005 |
| FR | 2 875 004 | A1 | 3/2006 |
| WO | 2007/054481 | A1 | 5/2007 |

OTHER PUBLICATIONS

U.S. Appl. No. 11/912,243, filed Oct. 22, 2007 (Not Published Yet).

U.S. Appl. No. 12/092,798, filed May 6, 2008 (Not Published Yet).

U.S. Appl. No. 11/683,989, filed Mar. 8, 2007 (Not Published Yet).

U.S. Appl. No. 11/870,338, filed Oct. 10, 2007 (Not Published Yet).

U.S. Appl. No. 11/963,753, filed Dec. 21, 2007 (Not Published Yet).

U.S. Appl. No. 12/030,392, filed Feb. 13, 2008 (Not Published Yet).

U.S. Appl. No. 12/047,885, filed Mar. 13, 2008 (Not Published Yet).

U.S. Appl. No. 12/047,633, filed Mar. 13, 2008 (Not Published Yet).

U.S. Appl. No. 12/118,129, filed May 9, 2008 (Not Published Yet).

* cited by examiner

DEVICES AND METHODS FOR FILTERING TERRAIN AND OBSTACLE ANTI-COLLISION ALERTS FOR AIRCRAFT

RELATED APPLICATIONS

The present application is based on, and claims priority from, French Application Number 07 01794, filed Mar. 13, 2007, the disclosure of which is hereby incorporated by reference herein in its entirety.

FIELD OF THE INVENTION

The present invention relates to a method for filtering anti-collision alerts for aircraft. It applies more particularly to the monitoring of anti-collision with the terrain and artificial obstacles in contexts such as civil flights in narrow corridors, mission flights with reduced altitude and lateral margins or relief skirting helicopter flights.

BACKGROUND OF THE INVENTION

The method according to the invention relates to the filtering of anti-collision alerts, when the aircraft is in proximity to the relief and obstacles, and more particularly relates to aircraft comprising a preventive function for detecting collision with obstacles aimed at preventing aeronautical accidents in which an aircraft that is still manoeuverable crashes on the ground or against an obstacle, doing so, as appropriate, despite prior alerts and alarms.

This type of accident is known in the technical literature by the acronym CFIT derived from the expression "Controlled Flight Into Terrain". While in the past it constituted a significant proportion of air disasters, accidents of CFIT type are henceforth avoided for the most part by virtue of terrain avoidance manoeuvres performed by crews when prompted by alerts and alarms originating from onboard systems for automatically signalling risks of collision with the terrain and obstacles, known by the term TAWS (the acronym derived from the expression: "Terrain Awareness & Alerting Systems"), which include the GCAS system (the acronym derived from the expression: "Ground Collision Avoidance System") and the T2CAS system (the acronym derived from the expression "Terrain & Traffic Collision Avoidance System"), that are developed and marketed by the company Thales.

The instruction given to an aircraft crew confronted with a risk of collision with the terrain or obstacles is to engage an avoidance manoeuvre in accordance with a predefined avoidance procedure which corresponds to a pure vertical avoidance manoeuvre termed "Pull-Up", consisting of a climb using the best performance of the aircraft, a manoeuvre termed "standard avoidance manoeuvre" or else "SVRM" standing for "Standard Vertical Recovery Manoeuvre".

Onboard equipment signalling, in an automatic manner, flight situations entailing risks of collision with the terrain and obstacles, sufficiently in advance so that an effective vertical avoidance manoeuvre is efficacious has been developed in recent years. Among this equipment, TAWS systems are the most impressive calling as they do upon a so-called FLTA function (the acronym standing for the expression: "Forward Looking Terrain Avoidance") which looks, ahead of the aircraft, along and below its trajectory vertically and laterally, to see if there is a potential risk of collision with the terrain and obstacles.

The principle of TAWS systems is based on monitoring the penetration of the terrain and obstacles into one or more protection volumes linked with the aircraft on the basis of modelling the terrain overflown. The reliefs of the region overflown are catalogued in a digital map accessible from the aircraft. The position of the aircraft with respect to the region overflown is provided by an item of flight equipment such as: inertial platform, satellite-based positioning receiver, baro-altimeter, radio-altimeter or a combination of several of these sensors. The protection volumes linked with the aircraft are advantageously defined so as to contain a modelling of the standard vertical avoidance manoeuvre trajectory engaged in a longer or shorter timescale on the basis of the trajectory followed by the aircraft as predicted on the basis of the flight parameters delivered by the aircraft's flight equipment, assuming that the aircraft preserves its on-trajectory or ground speed vector. The protection volumes linked with the aircraft are in general two in number, of tiered sizes, the furthest advanced being used to give an alert advising the crew of the aircraft that the trajectory followed will have to be modified in the medium term to avoid the terrain, and the closest being used to give an alarm advising the crew of the aircraft that they must actually engage, as a matter of great urgency, a vertical avoidance manoeuvre.

For further details on the concepts implemented in TAWS systems, reference may usefully be made to American patents U.S. Pat. No. 5,488,563, U.S. Pat. No. 5,414,631, U.S. Pat. No. 5,638,282, U.S. Pat. No. 5,677,842, U.S. Pat. No. 6,088,654, U.S. Pat. No. 6,317,663 and U.S. Pat. No. 6,480,120 and to French patent applications FR 2.813.963, FR 2.842.594, FR 2.848.661, FR 2.860.292, FR 2.864.270, FR 2.864.312, FR 2.867.851 and FR 2.868.835.

However, an operational nuisance potentially generated by such systems is the appearance of an inopportune alert linked with erroneous evaluation of the situation of the aircraft in relation to the terrain and surrounding obstacles. There therefore exists a requirement in operational TAWS systems for an adaptation of the logic for triggering alerts in flight situations for which the conventional methods are unsuitable because of the particular local configuration of the relief and obstacles. This may involve an environment in which the aircraft is made to deploy, procedurally, in constrained flight corridors, of small width and in immediate proximity to the surrounding reliefs.

Through the development of the performance of navigation and guidance systems, such procedures, known for example by the name RNP-0.1 procedure are appearing (RNP is the acronym standing for "Required Navigation Performance" describing the minimum guidance precision required by the complete processing chain of the aircraft in charge of guidance; 0.1 is the width of the prescribed corridor).

In such situations, which will be dubbed "controlled" hereinafter, the aircraft is made to follow a strict trajectory, published by the aeronautical authorities and guaranteed not to conflict with the relief and obstacles. The navigation/guidance systems and their internal checking devices guarantee the current integrity of the flight by monitoring any drifting of the prescribed corridor. In fact, so long as these systems do not detect any conditions necessitating abandonment of the conduct of the procedure, there is no actual operational risk since the procedures have been validated in flight.

Nevertheless, the segregation of the navigation and monitoring systems in aircraft necessitates external monitoring means that are as independent as possible so as to ensure a safety net making it possible to detect possible malfunctions of the navigation and guidance systems and of their internal checking functions.

Taking account of the proximity of the relief and obstacles during the conduct of "controlled" flight phases of guiding and piloting the aircraft, it is possible, according to the context of the aircraft and data intrinsic to the aircraft, such as topographic data, that the anti-collision monitoring system may give rise to a hindrance for the crew. This hindrance is due to too large a number of anti-collision alerts transmitted to the crew which do not always reflect an immediate or actual danger for the aircraft.

The problem therefore consists in reducing the rate of false alerts which cause operational nuisance for the crew. This false alert rate tends naturally to increase as the flight proceeds in proximity to the relief, taking account of:

positional uncertainties;

the granularity of the topographic database;

trajectory assumptions formulated by the monitoring system for estimating the most probable route followed by the aircraft in the forthcoming seconds.

The realization of this type of mission with the current equipment available on the market is recognized as frequently being subject to inopportune erroneous alert situation detections, thus generating audible nuisance for the crew and appreciable operational consequences. The pilot is induced, in the worse case, to unplug the monitoring device, so reducing the safety level of the mission.

A solution currently proposed by the equipment on the market consists simply in advocating in the flight manual that the audible alerts that arise should be temporarily or definitively removed. This solution in fact reduces the safety of the flight, since the checking of the navigation and guidance means is no longer ensured.

SUMMARY OF THE INVENTION

An aim of the invention is notably to alleviate the aforesaid drawbacks. For this purpose, the subject of the invention is a method for filtering alerts and an associated filter whose objective is to filter the audible and/or visual alerts after an analysis of the compliance of the conduct of the flight according to parameters restoring notably the conformity of the actual trajectory of the aircraft with the theoretical trajectory.

The invention makes it possible notably to analyse information relating to the aircraft, such as its positional deviations, its lateral and vertical angular deviations of its trajectory or else deviations of its speed. Analysis of these data makes it possible to establish a favourable or unfavourable filtering criterion for the anti-collision alerts, the filtering being performed according to the avoidance capability of the aircraft and degree of dangerousness of the alerts.

The invention relates to a device for filtering anti-collision alert for aircraft according to the invention, the said aircraft comprising:

a locating system charting the position of the aircraft at each instant and estimating the precision of its position;

a navigation system of the aircraft calculating at least the actual speed of the aircraft, the speed instruction and a first deviation between the instruction and the actual speed, the said deviation being compared with a first reference overshoot threshold;

an anti-collision system generating alerts;

an alarm manager of the aircraft centralizing the alerts transmitted by the terrain anti-collision equipment of the aircraft to the crew, the said alerts each possessing a coding of the danger level, the said danger levels forming part of a first predetermined set;

the said device comprising an alert filter that filters sets of alerts according to the coding of their danger level.

Advantageously, a method for filtering alerts comprises:

a first step comprising at least one measurement of the uncertainty in the position of the aircraft;

a second step of filtering alerts carried out by the alert filter, when the uncertainty in the position is less than a predefined margin;

a third step of transmitting the unfiltered alerts to the alarms manager of the aircraft carried out by the alert filter.

Advantageously, the first step comprises verifying the information regarding operation and integrity of the navigation and guidance systems used. The position uncertainty is considered greater than any tolerance margin as soon as one of the systems involved in navigation and guidance is not activated nor able to ensure its function with the required integrity level.

Advantageously, the first step comprises analysing the vertical and lateral angular deviations of the actual trajectory with respect to the theoretical trajectory and the second step comprises filtering a set of alerts as a function of their danger level when the vertical and lateral deviations do not overshoot respectively a second and a third predefined threshold value.

Advantageously, the said aircraft comprises a guidance system for the aircraft making it possible to compare the actual trajectory of the aircraft and the theoretical trajectory, a vertical deviation and a lateral deviation being compared with a second and a third reference overshoot threshold.

Advantageously, the first step comprises analysing the speed deviation of the aircraft and the second step comprises filtering a set of alerts as a function of their danger level when the speed deviation is lower than a fourth predefined threshold value.

Advantageously, the aircraft possesses an avoidance capability measured on the basis at least of the type of aircraft, of its weight and of its speed and comprising a topographic database and a calculation of a profile of the terrain overflown, the said profile being calculated on a space covered by the possible trajectories of the aircraft in a given angle during a given time span on the basis of obstacles referenced in the topographic database.

Advantageously, the first step comprises calculating a collision criterion on the basis of the evaluation of the avoidance capability of the aircraft and of the terrain profile overflown, and the second step comprises comparing this criterion with a fifth predefined threshold value.

Advantageously, the filtering of the alerts is carried out according to a coding comprising three levels, of which a first level, called CAUTION, is filtered when the uncertainty in the position is less than a predefined margin and the second and third predefined threshold values are not overshot.

Advantageously, the second level, called WARNING, is filtered when at least the uncertainty in the position is less than a predefined margin and the second, third and the fourth predefined threshold values are not overshot.

Advantageously, the alerts are audible alerts.

Advantageously, the device comprises three alert filters that filter sets of alerts according to the coding of their danger level.

Advantageously, the device for filtering anti-collision alert for aircraft comprises a function for comparing the alert filtered by the three filters, characterized in that in the event of non-agreement of the three filterings of an alert, the function transmits the alert to the alarm manager.

Advantageously, the device for filtering anti-collision alerts for aircraft comprises a function for comparing the alert filtered by the three filters, characterized in that in the event of non-agreement of the three filterings of an alert, the function transmits the alert to the alarm manager if at least two filters have not filtered the alert.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWING

The present invention is illustrated by way of example, and not by limitation, in the figures of the accompanying drawings, wherein elements having the same reference numeral designations represent like elements throughout and wherein.

DETAILED DESCRIPTION OF THE DRAWING

Figure 1:
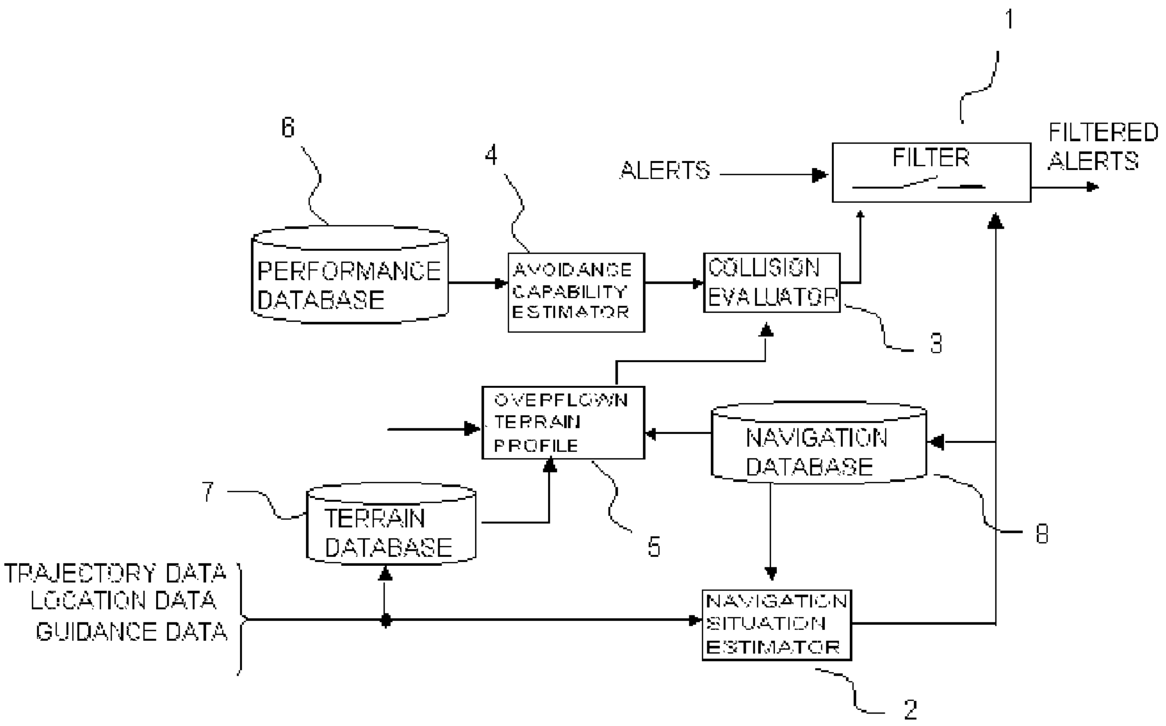
FIG. 1: the diagram of data analysis by the alert filter.

FIG. 1 presents a functional diagram of the equipment involved in an anti-collision system and their various exchanges of information. This information exchanged is of two different kinds, on the one hand, it comprises data specific to the aircraft, such as its position, its speed, its trajectory, its performance, and guidance data, flight instructions, for example and on the other hand, it comprises data intrinsic to the aircraft, such as terrain data, information that is referenced and useful for the aircraft in databases, for example landing runways, and air navigation data, for example information regarding beaconing or air corridors.

The method and the filter according to the invention make it possible notably in a given operational context, to evaluate the situation of the aircraft in particular by analysing the positioning, navigation and guidance information, so as to permit, according to the performance of the aircraft and the topology of the terrain, a filtering of alerts, more particularly of the alerts that could cause a hindrance for the crew.

An evaluation of the navigation situation is carried out by a function 2 for estimating the navigation situation so as to verify the compliance of the aircraft's movement conditions with the theoretical conditions. In particular this function relies on the instantaneous data provided by the navigation and guidance systems describing their state of operation and integrity. The position uncertainty will be considered greater than any tolerance margin as soon as one of the systems involved in navigation and guidance is not activated nor able to ensure its function with the required integrity level. Additionally, on the one hand it relies on the instantaneous data regarding location and, trajectory of the aircraft, and guidance and on the other hand on data originating from a navigation database 8.

The deviations relating to the situation can be, for example, a positional deviation of the aircraft with respect to its theoretical position, the latter position being calculated on the basis of its theoretical trajectory in automatic mode for example, and its instantaneous actual position measured on the basis of the locating system, of GPS type for example. The deviation between the theoretical position and the actual position can originate notably from insufficient precision of the locating systems, from a change of course of the aircraft in manual mode, an emergency landing, from a drift linked with outside conditions such as the wind. In the case of a significant deviation or one which is greater than a predefined threshold, no alert filtering action will be undertaken.

An alert filter 1 makes it possible, on the basis of input data originating from the function 2 for estimating the navigation situation, to apply filtering rules. A computer is integrated with the filter 1. The alerts not filtered by the filter 1 are thereafter transmitted to the crew by way of a viewing screen or an auditory device for the audible alerts.

In an analogous manner, the data relating to the trajectory of the aircraft such as the lateral and/or vertical angular deviations with respect to an ideal trajectory originating from the aircraft's navigation system make it possible to ascertain and to judge the integrity of the aircraft's trajectory.

As soon as a deviation or a combination of deviations of these parameters overshoots a tolerance threshold beyond which it can be considered that the navigation performance required to ensure the continuity of the flight in automatic mode are not fulfilled, the function 2 for estimating the navigation situation issues a negative opinion as to the possibility of filtering a possible terrain anti-collision alert.

Additionally, a third criterion relating to the data specific to the aircraft is its speed and the deviation of its instantaneous speed with respect to an instruction speed. Beyond a threshold, if the aircraft's speed deviation with respect to an instruction is too significant, then a negative opinion of the function 2 is transmitted to the anti-collision alert filter 1.

Moreover the method according to the invention makes it possible to take into account data not directly specific to the aircraft, such as topographic data, beaconings or air corridors and elements situated geographically in proximity to the aircraft, the elements being referenced in databases of the aircraft.

Notably air corridors are defined and make it possible to pinpoint the position of the aircraft in this corridor.

There are several ways to calculate and to extrapolate the trajectories of an aircraft in an air corridor with a view to forecasting the aircraft's trajectory deviations with respect to an ideal or theoretical trajectory defined in an air corridor.

Figure 2A:
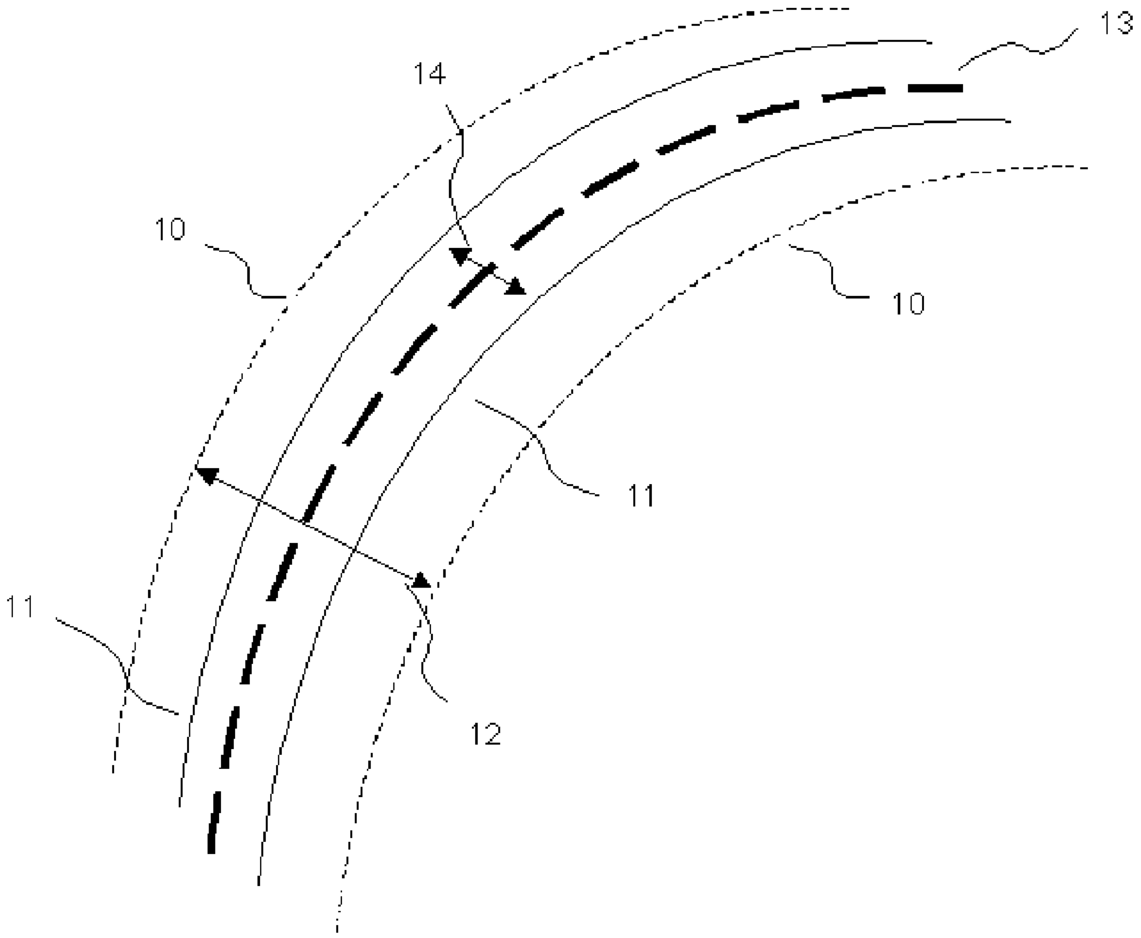
FIG. 2*a*: an air corridor and the safety margins.

A first case of realization is based on FIG. 2*a* which represents an ideal trajectory 13 of the aircraft. The corridor 11 defines a required navigation zone in which the aircraft must not deviate. It is considered that the aircraft follows its ideal trajectory if it does not exit the corridor 11. Its position can be obtained by an item of flight equipment such as defined previously. A margin 14 defines the width of the corridor 11. During a flight of an aircraft, according to the outside conditions and other parameters relating to the topography of the terrain, for example the altitude of the relief, a second margin 12 defines a second corridor 10 on either side of the ideal trajectory that the aircraft must follow.

This second margin 12 ensures that a simple deviation with respect to the ideal trajectory is acceptable if a correction is maintained to restore the aircraft to the corridor 11 of the ideal trajectory. The said correction is affirmed if the estimation of the trajectory of the aircraft for the forthcoming few seconds, the estimation being carried out on the basis of the measurement of its speed, its heading and the wind, ensures that it will remain in the corridor defined by the margin 12. This second corridor defines aerial limits beyond which a crossing of the aircraft then disables the filtering of the anti-collision alerts.

Figure 2B:
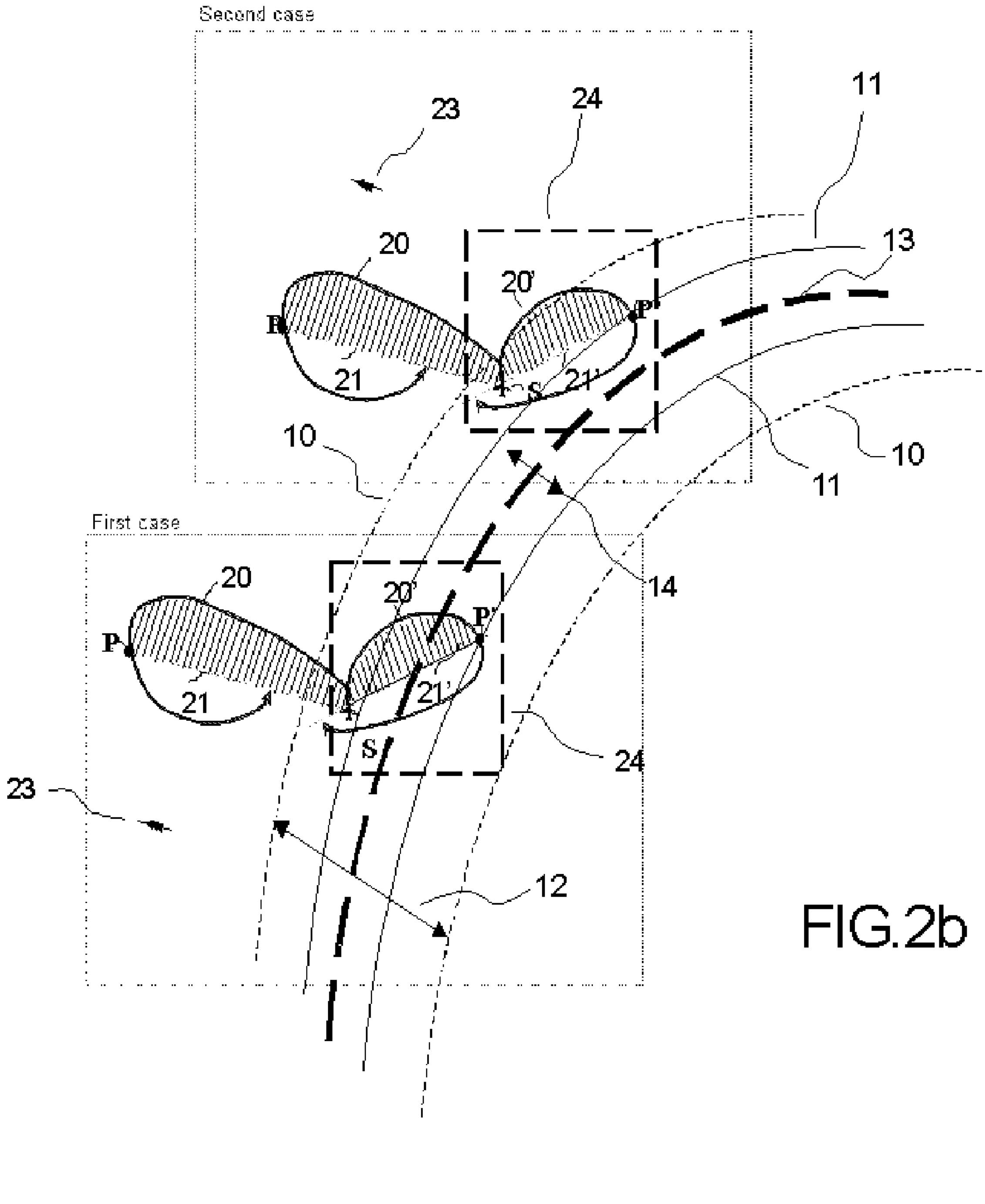
FIG. 2*b*: the intersection of the limits of an air corridor and perimeters of the extrapolated trajectories of an aircraft.

A second case of realization is based on FIG. 2*b* which represents the extrapolation of trajectories in a given perimeter of an aircraft. Such a solution is described in patent FR 2875004, which describes the perimeters in which the trajectories of the aircraft are extrapolated.

The perimeters are defined on the basis of the current position S of the aircraft, of points P, P' situated at the limit of a cone of the space, the cone being delimited by two axes 21, 21', situated in front of the aircraft and trajectories at the limits 20, 20' when it is considered that the aircraft is performing a turn according to a heading at the limits.

The trajectories at the limits 20, 20' are calculated on the basis of the speed of the aircraft, its heading and the measured wind 23.

In this second case of realization, two examples are illustrated in FIG. 2*b* so as to calculate the deviation of the trajectory of the aircraft from the air corridor and its margins 10. In this case of realization, the perimeter of the extrapolated trajectories, situated in front of the aircraft, is now considered, rather than the positional deviation in the air corridor. This perimeter is re-calculated continuously as a function of the data of the aircraft and of the wind 23. This perimeter comprises two lateral parts with respect to the aircraft as illustrated in the figure.

The invention proposes that the situation of the aircraft be considered no longer in accordance with its theoretical trajectory as soon as the opposite perimeter from the limit of the margin 10 of the air corridor is crossed by this same perimeter.

FIG. 2*b* illustrates a first case where in the zone 24, the perimeter 20' of the aircraft does not cross the limit 10 which defines the air corridor and its margin.

Additionally, FIG. 2*b* illustrates a second case where in the zone 24, the perimeter 20' of the aircraft crosses the limit 10 of the air corridor.

U.S. Pat. No. 2,875,004 makes it possible to obtain the parameters linked with the definition of these perimeters. The definition of the air corridors and safety margins being known, the invention proposes that this intersection be measured and that as soon as a crossing is detected, the alert filter no longer filters the anti-collision alerts.

By way of the function 2 for estimating the navigation situation, the consideration of the criteria relating to the air corridors and to the beaconing makes it possible to add an additional check before permitting a possible filtering of the alerts. This check is performed in such a manner that the absence of any element of at least one navigation procedure known in the navigation database at a distance at most equal to the margin 12 from the current position of the aircraft disables the filtering of the anti-collision alerts.

This function reduces the inopportune risks of filtering alert situations by a geographical consolidation of the zones in which the filtering may be envisaged.

Additionally, data of the terrain model are stored in a terrain and obstacles database 7 of the aircraft and are available locally. This terrain and obstacles database 7 allows items of equipment of TAWS type to map the space situated in front of the aircraft, to evaluate the potential risks for the aircraft and to issue alerts. The structures of the terrain data and terrain databases of an item of equipment of TAWS type are defined in the patents cited previously above.

The method according to the invention makes it possible to process the terrain data which are correlated with the aircraft's trajectory data, the latter being sampled, so as to establish a profile 5 of the terrain overflown or situated in front of the aircraft. The profile establishes for a set of potential trajectories of the aircraft, as a function of the topology of the terrain, extrapolations of the aircraft's trajectories and associated risks of collisions. The profile can be enhanced with data arising from the navigation database so as to establish a profile conforming to the situation of the aircraft.

Figure 2C:
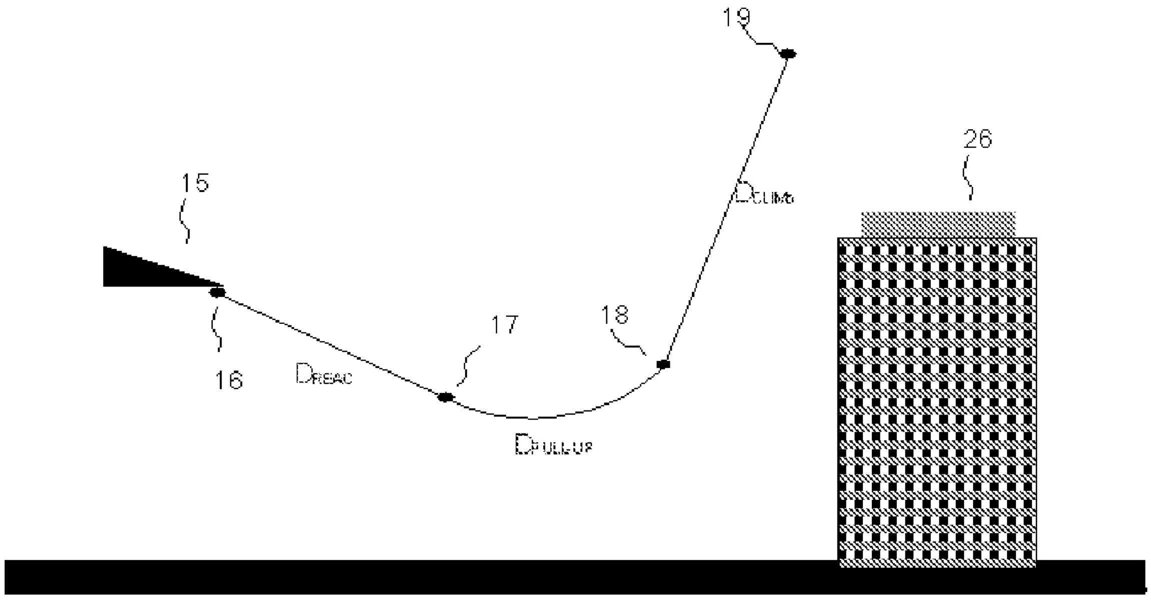
FIG. 2*c*: an extrapolated trajectory of an aircraft during an obstacle vertical avoidance procedure, for example.

FIG. 2*c* exhibits a diagram of an aircraft 15 flying with a ground speed, wherein a computer makes it possible to formulate and to predict the possible trajectory of the aircraft in the course of a vertical avoidance manoeuvre for an obstacle 26. This avoidance trajectory is identical for the case of the relief of the terrain. Hereinafter, the ground speed of the aircraft will be designated as the speed of horizontal movement of the aircraft with respect to the earth. The same form of manoeuvre has to be considered for terrain avoidance.

An exemplary calculated trajectory is decomposed into three parts, viz. two segments and a curve. A first segment, formed by a first position 16 representing the nose of the aircraft and a second position 17, represents the trajectory of the aircraft according to its instantaneous heading and instantaneous ground speed, this portion of the trajectory being calculated over a fixed duration. This first duration is denoted $D_{REAC}$, it can be 20 seconds for example. A second part of the trajectory represents the curve of the trajectory making it possible for the aircraft to progress from the second position 4 to a third position 18. This trajectory corresponds to the path traversed for a fixed determined duration, denoted $D_{PULL-UP}$, required by the aircraft in order to be in a climb situation. The third segment represents at constant heading, the progress of the aircraft climbing for a fixed duration, denoted $D_{CLIMB}$, considering the instantaneous speed of the aircraft. This segment begins from the start-of-climb position 18 up to the last calculated position 19 of the trajectory.

The durations $D_{REAC}$, $D_{PULL-UP}$, $D_{CLIMB}$, are generally fixed whatever the topology of the terrain overflown or conditions outside the aircraft, the sum of these durations is called the duration of extrapolation.

This trajectory is currently established in certain aircraft in order to ascertain the impending situation and positioning of the aircraft so as to warn the crew of an imminent danger. The extrapolated trajectory is thus constantly calculated and compared with an obstacle base. Alerts are then issued so as to warn the crew of the presence of one or more obstacle(s) in view, on at least one of the extrapolated trajectories. Generally, the margin $D_{REAC}$ creates a reaction lag in order for the crew to undertake an avoidance manoeuvre.

As a function of a performance database 6 specific to the aircraft, notably its type, its motorization and its weight, an avoidance capability estimator 4 makes it possible to evaluate at each instant the manoeuvrability of the aircraft and the minimum parameters to be ensured in order to guarantee the safety of the aircraft notably when predicting the presence of an obstacle.

A collision evaluator 3 correlating the information arising from the avoidance capability estimator 4 and the profile 5 makes it possible to determine a criterion transmitted to the filter that disables or permits filtering.

The terrain profile 5 is determined notably on the basis of the presence of the obstacles and of their height in a determined perimeter and of an index making it possible to index the dangerousness of a zone as a function of the trajectory of the aircraft, its altitude and its speed.

The quantified risk of an impact of the aircraft on an obstacle of the terrain or a part of the terrain will be called the dangerousness. It is quantified in predetermined zones referenced in the topographic database in existing systems.

As soon as an intersection is predicted between the profile 5 estimated by taking account of the aircraft's relief avoidance capability and the evaluated terrain profile, the collision evaluator 3 issues a negative opinion on the possibility of filtering a possible terrain anti-collision alert.

The method according to the invention allows the anti-collision alert filter to weight the criteria for filtering, notably the positional deviation of the aircraft or the precision of the position, lateral and vertical deviations of the trajectory of the aircraft, deviations of its speed, deviations of the aircraft with respect to a referenced beaconing or to predefined air corridors, issued collision risks arising from the analysis of the terrain topology and the aircraft's avoidance capability profile.

One case of realization makes it possible to define a coefficient for weighting the aforesaid criteria so as to optimize a filtering of the alert filter targeted as a function of the significance of certain criteria with respect to others.

The invention then proposes that the weighting coefficient be defined by the following expression:

$$C = \left[ \left( \prod_{i=1}^{n} (1 + C_i)^{\alpha_i} \right)^{\frac{1}{\sum_{i=1}^{n} \alpha_i}} - 1 \right],$$

where $C_i$ are coefficients lying between 0 and 1, relating to each parameter taken into account to weight either the duration $D_{CLIMB}$ of extrapolation of the aircraft's trajectory or else to weight the relative deviation of a parameter as a function of a reference level.

The coefficients $\alpha_i$ are powers applied to each of the normalized coefficients which is a function of the significance of the influence of a parameter that is to be favoured with respect to the other parameters.

The anti-collision equipment makes it possible to generate several types of alerts as a function of the dangerousness level, such as their altitude or their position referenced in terms of margin or on the trajectory of the aircraft. For example for a system of TAWS type, certain items of equipment codify these levels according to three degrees of alerts: "CAUTION", "WARNING", "AVOID"

The "CAUTION" alert conveys a low risk of dangerousness and therefore a presence, in proximity to the aircraft, of obstacles not constituting an immediate danger. The "WARNING" alert conveys a more significant dangerousness level. This alert indicates to the crew the necessity to undertake, in a given time span, a "PULL UP" action, a term signifying that the pilot must do what is necessary in order for the aircraft to gain altitude. Finally a last alert "AVOID" conveys a high risk of dangerousness, and therefore of collision. This alert signifies that the crew must undertake an action other than "PULL UP" to avoid the obstacle, which may be a bypassing of the obstacle to the right or to the left for example.

One case of realization of the method according to the invention makes it possible to filter one or more alerts insofar as the filtering acceptance conditions may vary as a function of the dangerousness level of the alert.

In the case of an item of anti-collision equipment processing three dangerousness levels, the alert filter makes it possible as a function of the filtering criteria, defined previously, to process the alerts differently as a function of their associated dangerousness level by defining values of decision thresholds specific to each of the alert levels.

Figure 3:
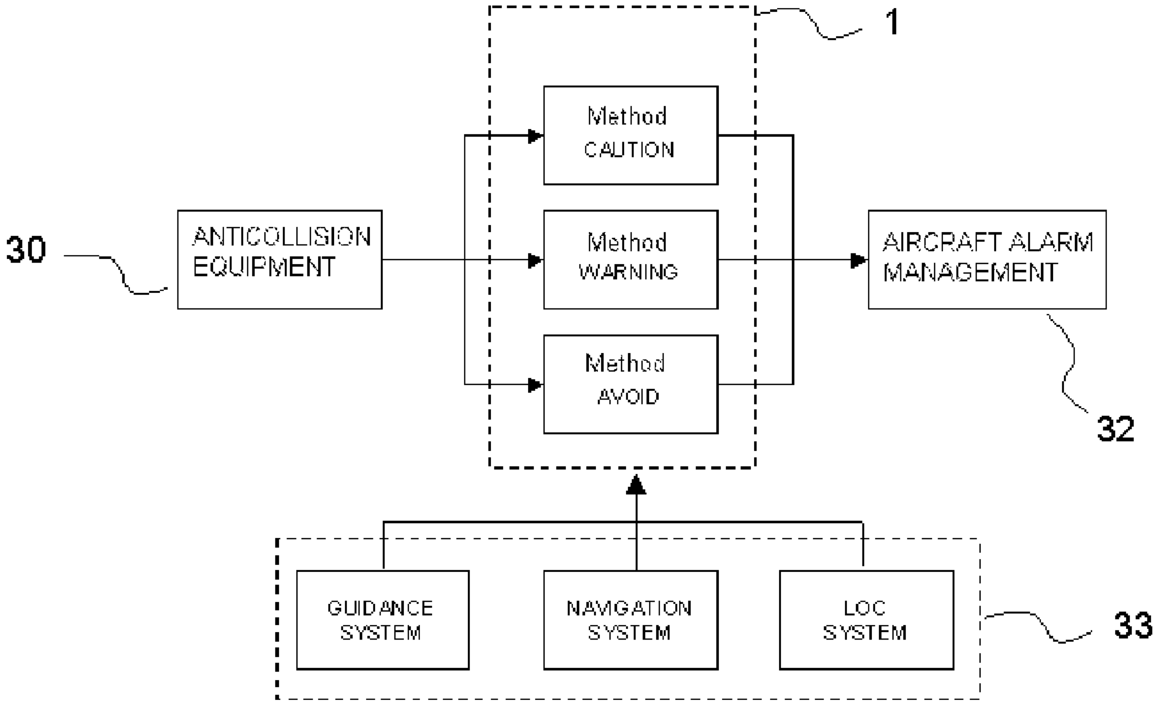
FIG. 3: the functional diagram of the filtering of the anti-collision alerts.

FIG. 3 represents a functional diagram of the method of filtering according to the dangerousness levels of the alerts. An item of anti-collision equipment 30, of TAWS type for example, transmits various alerts to the filter 1.

The various levels, as described previously, are "CAUTION", "WARNING" and "AVOID". The method, according to the criteria transmitted by the various systems 33 for navigation, guidance and positioning, allows the alert filter 1 to process the various alerts by selective filtering dependent on their dangerousness level so as to transmit them to the aircraft's alert manager 32.

An exemplary case of discriminating the alerts according to the various criteria can be:

for the alerts of "AVOID" type no filtering is implemented;

for the alerts of "WARNING" type, the filtering method according to the invention analyses according to predefined thresholds the criteria relating to the positional deviations, the precision of the position, the lateral and vertical deviations of the aircraft's trajectory, deviations of its speed, deviations of the aircraft with respect to a referenced beaconing or to predefined air corridors, issued collision risks arising from the analysis of the terrain topology and the aircraft's avoidance capability profile.

If no threshold is crossed, then the filtering of the alerts of "WARNING" type can be carried out;

for the alerts of "CAUTION" type, an exemplary case of implementation of the method according to the invention makes it possible to analyse the criteria relating to the position of the aircraft and to the lateral and vertical deviations of its trajectory.

Therefore, the more an alert signifies a significant danger, of WARNING type, the larger the number of criteria analysed for applying a filtering, and the more the envisaged margins are decreased. On the other hand, for less significant dangers, of CAUTION type, only a few criteria are analysed to apply a filtering possibly applied with wider margins.

The advantage of such a filtering resides in the possibility of filtering a large number of alerts indicating a low danger to the crew and of filtering a reduced number alerts of a danger indicating a more significant danger. This filtering advantageously makes it possible to meet the operational requirements of removing nuisance due to the large number of alerts generated, alerts which represent little danger being the most probable in such procedures. The filtering of the device according to the invention in no way penalizes the safety level ensured by the monitoring equipment.

Other cases of filtering according to the dangerousness level of the alerts can be envisaged according to the same filtering method.

The method according to the invention makes it possible moreover to add a further safety level so as to avoid cases of errors of the filtering, notably the case of filtering of alerts indicating a real danger to the crew. A proposed solution is to place three filters, identical to the filter 1, in parallel, formulating their decisions on data arising from different systems and sensors of the aircraft and to define a vote criterion arising from the analysis of a filtering or otherwise of the alerts so as to ensure a minimum risk of failure.

Figure 4:
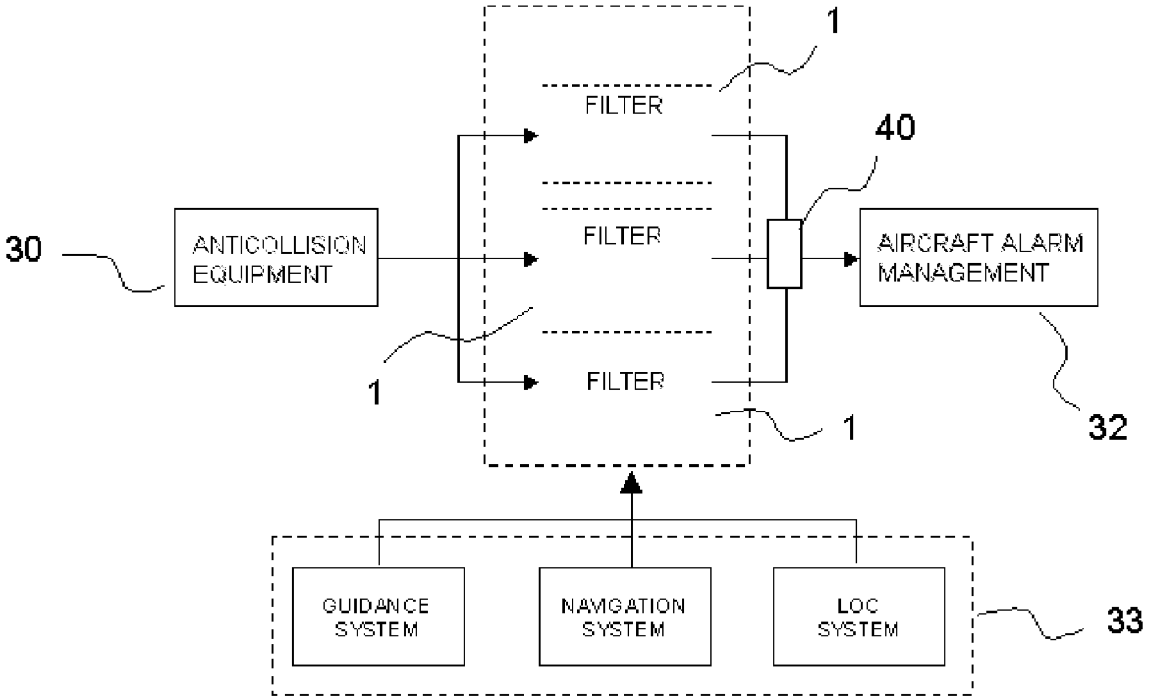
FIG. 4: the redundancy schematic for the anti-collision alert filters for a secure filtering method.

FIG. 4 represents three filters 1, each of the filters being defined as previously. An item of anti-collision equipment transmits the alerts to each of the three filters 1 in parallel. The navigation, positioning and guidance information originating from the various systems of the aircraft makes it possible to determine filtering criteria based on predefined thresholds for each of the filters 1.

A function 40 makes it possible to analyse, after filtering of the three filters 1, the agreement of the filtered alerts with a view to being transmitted to the alarms manager 32.

Several laws for verifying the filtering can be implemented according to the method of the invention.

A first case of realization makes it possible to validate the filtering if and only if the three computers of the filters 1 concur regarding permission for the filtering of an alert.

As soon as one of the computers of the filters 1 considers, by analysing the previously defined criteria, that filtering is not permitted, the alert, if any, generated by the anti-collision equipment is therefore transmitted to the crew.

For systems having more than two filtering devices, the implementation of the step of verifying the filtering agreement is carried out by the function 40 by a minority vote. As soon as one of the computers considers the situation potentially dangerous, the alert is given.

A second case of realization makes it possible to decide through a majority vote function based on the state of each computer of each filter, the filtering to be applied. That is to say, the majority result of a filtering of several independent filters is considered to be true.

This function 40 has two main advantages making it possible to improve the safety of a filtering of alerts. On the one hand it allows redundancy of the filters and makes it possible to alleviate a possible case of a fault with one of the filters, the filtering function is in this case taken over by the remaining filters. Moreover this function makes it possible to add a criterion regarding the agreement of the decisions taken by the filters and notably by the computers of each filter so as to guarantee the validity of a decision taken.

The main advantage of the invention is that of reducing the nuisance due to the issuing of too large a number of alerts not always returning a level of actual danger for the aircraft and the crew.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of filtering anti-collision alerts for an aircraft, the aircraft having a terrain anti-collision equipment configured to transmit alerts to an alarm manager of the aircraft through an alert filter, the alerts each possessing a coding corresponding to one of at least three danger levels including:

- a first level corresponding to a low risk of dangerousness indicating a presence, in proximity to the aircraft, of obstacles not constituting an immediate danger;
- a second level corresponding to a more significant dangerousness level advising gaining altitude for the aircraft within a given time span; and
- a third level corresponding to a high risk of dangerousness advising undertaking an action other than the action corresponding to the second level, the method comprising:

evaluating a situation of the aircraft;

determining if a corridor defined along a predefined ideal trajectory is crossed by the aircraft according to the result of the evaluation;

after it is determined that the corridor is not crossed, selectively filtering out alerts of the first level and the second level by the alert filter according to multiple criteria transmitted by various systems for navigation, guidance, or positioning of the aircraft and allowing transmission of alerts of the third level and unfiltered alerts of the first level and the second level to the alarm manager of the aircraft; and after it is determined that the corridor is crossed, disabling the filtering and allowing transmission of all alerts to the alarm manager of the aircraft.

2. The method according to claim 1, wherein the evaluation of the situation of the aircraft comprises evaluating a position and the precision of the position by a locating system.

3. The method according to claim 1, wherein the evaluation of the situation of the aircraft comprises verifying the information regarding operation and integrity of navigation and guidance systems.

4. The method according to claim 1, wherein the aircraft comprises:

a system configured to guide the aircraft and to provide information including an actual trajectory of the aircraft, a theoretical trajectory, a vertical deviation, and a lateral deviation, wherein the evaluation of the situation of the aircraft comprises analyzing vertical and lateral angular deviations of the actual trajectory with respect to the theoretical trajectory, and the filtering comprises filtering an alert as a function of its danger level when the vertical and lateral deviations do not overshoot respectively a vertical and a lateral threshold value.

5. The method according to claim 1, wherein the evaluation of the situation of the aircraft comprises calculating a deviation between an actual speed of the aircraft and a speed instruction, said deviation being compared with a speed overshoot threshold, and the filtering comprises filtering an alert as a function of its danger level when the speed deviation is lower than the speed threshold value.

6. The method according to claim 1, the aircraft possessing an avoidance capability measured on the basis at least of the type of aircraft, of its weight, and of its speed and comprising a topographic database and a calculation of a profile of the terrain overflown, the said profile being calculated on a space covered by possible trajectories of the aircraft in a given angle during the given time span on the basis of obstacles referenced in the topographic database, the calculation of a collision criterion on the basis of the evaluation of the avoidance capability of the aircraft and of the terrain profile overflown being calculated, wherein the evaluation of the situation of the aircraft comprises measuring the collision criterion, and the filtering comprises comparing this criterion with a predefined threshold value.

7. The method according to claim 1, wherein the filtering of the alerts of the first level is carried out when the uncertainty in the position is less than a predefined margin and a vertical and a lateral threshold values are not overshot.

8. The method according to claim 1, wherein the filtering of the alerts of the second level is carried out when at least the uncertainty in the position is less than a predefined margin and a vertical, a lateral, and a speed threshold values are not overshot.

9. The method according to claim 1, wherein the alerts are audible alerts.

10. An anti-collision alerting system for an aircraft comprising:

a locating system charting a position of the aircraft at each instant and estimating the precision of the position;

a navigation system of the aircraft calculating at least an actual speed of the aircraft and speed instruction;

an anti-collision system generating alerts, said alerts each possessing a coding corresponding to at least one of three danger levels including:

- a first level corresponding to a low risk of dangerousness indicating a presence, in proximity to the aircraft, of obstacles not constituting an immediate danger;

a second level corresponding to a more significant dangerousness level advising gaining altitude for the aircraft within a given time span; and a third level corresponding to a high risk of dangerousness advising undertaking an action other than the action corresponding to the second level;

an alert filter configured to:

after it is determined, according to a deviation of the position or the speed of the aircraft, that the aircraft does not cross a corridor defined along a predetermined ideal trajectory, selectively filter out alerts of the first level and the second level according to multiple criteria transmitted by various systems for navigation, guidance, or positioning of the aircraft and allow transmission of alerts of the third level and unfiltered alerts of the first level and the second level to an alarm manager of the aircraft; and after it is determined that the corridor is crossed, disable the filtering and allow transmission of all alerts to the alarm manager; and the alarm manager of the aircraft centralizing the unfiltered alerts transmitted by the terrain anti-collision equipment of the aircraft through the alert filter.

11. The system according to claim 10, wherein the system comprises at least three alert filters configured to filter the alerts according to the coding of the danger level.

12. The system according to claim 11, comprising a function for comparing the alerts filtered by the three filters, and in the event of non-agreement of the three filterings of an alert, the function transmits the alert to the alarm manager.

13. The system according to claim 11, comprising a function for comparing the alerts filtered by the three filters, wherein in the event of non-agreement of the three filterings of an alert, the function transmits the alert to the alarm manager if at least two filters have not filtered the alert.

* * * * *